US010019154B2

(12) United States Patent
Liu et al.

(10) Patent No.: US 10,019,154 B2
(45) Date of Patent: Jul. 10, 2018

(54) METHOD, APPARATUS AND COMPUTER PROGRAM PRODUCT FOR OPERATING ITEMS WITH MULTIPLE FINGERS

(71) Applicant: HTC CORPORATION, Taoyuan (TW)

(72) Inventors: Ching-Tung Liu, Taoyuan (TW);
Hsueh-Chun Chen, Taoyuan (TW);
Chih-Wei Yang, Taoyuan (TW);
Wei-Nien Shih, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 357 days.

(21) Appl. No.: 15/003,358

(22) Filed: Jan. 21, 2016

(65) Prior Publication Data

US 2016/0139801 A1 May 19, 2016

Related U.S. Application Data

(62) Division of application No. 13/831,909, filed on Mar. 15, 2013, now Pat. No. 9,285,980.

(Continued)

(51) Int. Cl.
*G06F 3/0488* (2013.01)
*G06F 3/0483* (2013.01)
(Continued)

(52) U.S. Cl.
CPC ........ *G06F 3/04883* (2013.01); *G06F 3/0483* (2013.01); *G06F 3/0486* (2013.01);
(Continued)

(58) Field of Classification Search
CPC ............... G06F 3/0488; G06F 3/04883; G06F 3/04886; G06F 3/04845
See application file for complete search history.

(56) References Cited

U.S. PATENT DOCUMENTS 8,473,870 B2  6/2013  Hinckley et al.
8,745,490 B2 * 6/2014  Kim ........................ G06F 3/042
                                                    345/173
(Continued)

FOREIGN PATENT DOCUMENTS

CN  101796478 A  8/2010
CN  102016777 A  4/2011
(Continued)

*Primary Examiner* — Kumar Patel
*Assistant Examiner* — Amy C Onyekaba
(74) *Attorney, Agent, or Firm* — Birch, Stewart, Kolasch & Birch, LLP

(57) ABSTRACT

A method, an apparatus and a computer program product for operating items with multiple fingers, adapted to a portable apparatus having a touch screen, are provided. In the method, a first touch operation performed on at least one item displayed on the touch screen is detected. A time of the first touch operation staying on the at least one item is accumulated and determined whether to be over a threshold. When the staying time is over the threshold, an edit mode of the item is entered and a second touch operation performed on the touch screen is detected. Finally, the at least one item is operated according to the first touch operation and the second touch operation.

18 Claims, 9 Drawing Sheets

Related U.S. Application Data

(60) Provisional application No. 61/612,931, filed on Mar. 19, 2012.

(51) Int. Cl.
  *G06F 3/0481* (2013.01)
  *G06F 3/0486* (2013.01)

(52) U.S. Cl.
  CPC ........ G06F 3/0488 (2013.01); G06F 3/04817 (2013.01); *G06F 2203/04104* (2013.01); *G06F 2203/04808* (2013.01)

(56) References Cited

U.S. PATENT DOCUMENTS

| | | | | |
|---|---|---|---|---|
| 8,892,168 B2* | 11/2014 | Yang | ................... | G06F 3/04817 340/689 |
| 2006/0112335 A1* | 5/2006 | Hofmeister | ........... | G06F 3/0488 715/701 |
| 2008/0297482 A1 | 12/2008 | Weiss | | |
| 2011/0209103 A1* | 8/2011 | Hinckley | ............... | G06F 3/0416 715/863 |
| 2011/0246918 A1* | 10/2011 | Henderson | .......... | G06F 3/04817 715/769 |
| 2011/0252346 A1* | 10/2011 | Chaudhri | ............ | G06F 3/04817 715/765 |
| 2011/0252375 A1* | 10/2011 | Chaudhri | ............ | G06F 3/04817 715/835 |
| 2011/0271182 A1 | 11/2011 | Tsai et al. | | |
| 2013/0141359 A1* | 6/2013 | Long | ..................... | G06F 3/0482 345/173 |
| 2013/0152018 A1* | 6/2013 | Chuang | ................. | G06F 3/0488 715/823 |
| 2014/0289669 A1* | 9/2014 | Wang | .................. | G06F 3/04817 715/781 |

FOREIGN PATENT DOCUMENTS

| | | |
|---|---|---|
| CN | 102033710 A | 4/2011 |
| CN | 102147679 A | 8/2011 |
| TW | 201145147 A1 | 12/2011 |

\* cited by examiner

METHOD, APPARATUS AND COMPUTER PROGRAM PRODUCT FOR OPERATING ITEMS WITH MULTIPLE FINGERS

CROSS-REFERENCE TO RELATED APPLICATION

This application is a Divisional application of co-pending application Ser. No. 13/831,909, filed on Mar. 15, 2013, which claims the priority benefit of U.S. provisional application Ser. No. 61/612,931, filed on Mar. 19, 2012. The entire contents of each of the above applications are hereby incorporated by reference.

BACKGROUND

Field of the Invention

The present invention is directed to a touch method and an apparatus thereof and more particularly, to a method and an apparatus for operating items with multiple fingers.

Description of Related Art

To cope with a busy pace of modern life, various portable apparatuses occupying less space and easy to carry are developed. Taking a personal digital assistant (PDA), a PDA phone or a smart phone as an example, it not only has various functions of a conventional communication device but also allows a user to write documents, send and receive emails, browse websites, or use instant messaging software through built-in software.

However, the portable apparatus requiring features of lightness, slimness, shortness, and smallness is limited in volume, and a display area of a screen is also limited. In order to display all desired information in the limited space with the consideration of viewing comfort and operational convenience of a user, each data is arranged and displayed on the screen in a form of item, such as an icon or a thumbnail, such that the user may operate each item through finger touch.

Nevertheless, the conventional touch operation is limited to touching of a single item. A variation of the touch operation is also limited to a gesture operation with one or more fingers, and one gesture corresponds to a function. Such operation manner has advantages of being simple and intuitional, but also comes with disadvantages of lacking variety and being incapable of multiple items. Therefore, it is necessary to provide a more intuitional and convenient method to assist the user in operating a plurality of items on the screen.

SUMMARY

The present invention provides a method, an apparatus and a computer program product for operating items with multiple fingers, in which a plurality of items on a screen may be operated with multiple fingers.

The present invention is directed to a method for operating items with multiple fingers, which is adapted to a portable apparatus having a touch screen. In the method, a first touch operation performed on at least one first item displayed on the touch screen is detected. A staying time of the first touch operation on the lat least one first item is accumulated, and whether the staying time is over a threshold is determined. When the staying time is over the threshold, an edit mode of the at least one first item is entered, and a second touch operation performed on the touch screen is detected. Finally, the at least one first item is operated according to the detected first touch operation and second touch operation.

In an embodiment of the present invention, the first touch operation includes a plurality of touch points and the touch points are respectively located on the at least one first item.

In an embodiment of the present invention, after the step of entering an edit mode of the at least one first item when the staying time is over the threshold, the method further creates a new folder to place the at least one first item when the touch points of the first touch operation are released simultaneously.

In an embodiment of the present invention, the step of detecting the second touch operation performed on the touch screen and operating the at least one first item according to the detected first touch operation and the detected second touch operation includes detecting the second touch operation performed on a second item displayed on the touch screen so as to open the second item and display a result page and then, moving the at least one first item to the result page according to a movement of the first touch operation, and adding the at least one first item to the result page when the first touch operation is released. The second item includes a folder, a menu, an icon or a widget.

In an embodiment of the present invention, the step of detecting the second touch operation performed on the touch screen and operating the at least one first item according to the detected first touch operation and second touch operation includes detecting the second touch operation swiped on the touch screen, switching from a current page displayed by the touch screen to a result page according a swiping direction of the second touch operation and adding the at least one first item to the result page when the first touch operation is released.

In an embodiment of the present invention, the step of adding the at least one first item to the result page when the first touch operation is released further includes rearranging items in the result page according to an arrangement rule or placing the at least one first item in a position corresponding to its original position in the result page.

In an embodiment of the present invention, the step of entering the edit mode of the at least one first item further includes floating the at least one first item on a current page displayed by the touch screen.

The present invention is directed to an apparatus for operating items with multiple fingers, which includes a detection module, a determination module, an edit module and an operation module. The detection module is configured to detect a first touch operation performed on at least one first item displayed on a touch screen. The determination module is configured to accumulate a time of the first touch operation staying on the lat least one first item and determine whether the staying time is over a threshold. The edit module is configured to enter an edit mode of the at least one first item when the determination module determines that the staying time is over the threshold. The operation module detects a second touch operation performed on the touch screen by using the detection module and operates the at least one first item according to the first touch operation and the second touch operation detected by the detection module.

In an embodiment of the present invention, the first touch operation includes a plurality of touch points and the touch points are respectively located on the at least one first item.

In an embodiment of the present invention, the operation module creates a new folder to place the at least one first item when the touch points of the first touch operation are released simultaneously.

In an embodiment of the present invention, the operation module further detects the second touch operation performed on a second item displayed on the touch screen so as to open the second item and display a result page, moves the at least one first item to the result page according to a movement of the first touch operation and adds the at least one first item to the result page when the first touch operation is released. The second item comprises a folder, a menu, an icon or a widget.

In an embodiment of the present invention, the operation module detects the second touch operation swiping on the touch screen by using the detection module, switches from a current page displayed by the touch screen to a result page according a swiping direction of the second touch operation and adds the at least one first item to the result page when the first touch operation is released.

In an embodiment of the present invention, the operation module further rearranges items in the result page according to an arrangement rule or places the at least one first item in a position corresponding to its original position in the result page after moving the at least one first item to the result page.

In an embodiment of the present invention, the edit module floats the at least one first item on a current page displayed by the touch screen when entering the edit mode of the at least one first item.

The present invention is further directed to a computer program product, for being loaded to a portable apparatus to perform steps as follows. First, a first touch operation performed on at least one first item displayed on the touch screen is detected. A time of the first touch operation staying on the lat least one first item is accumulated so as to determine whether the staying time is over a threshold. When the staying time is over the threshold, an edit mode of the at least one first item is entered, a second touch operation performed on the touch screen is detected, and finally, the at least one first item is operated according to the detected first touch operation and second touch operation.

To sum up, in the method, the apparatus and the computer program product for operating items with multiple fingers of the present invention, the edit mode of the items is entered by multiple fingers continuously touching the items with another finger performing a gesture, such as tapping, swiping or pinching in/out on the screen to perform an operation, such as moving, collecting or page transferring, on the items being edited. Thereby, the variety for a user to operate the items displayed on the portable apparatus may be increased.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

When holding a portable apparatus to operate, a user generally holds the portable apparatus with one hand and performs touch operation with the other hand. Accordingly, the present invention improves the method for operating a single item with a finger and provides the user with a method to trigger an edit mode by touching multiple items with multiple fingers so as to perform an edit operation on the multiple items. Through finger operation of the other hand, a variety of the operations performed by a user can be increased.

Figure 1:
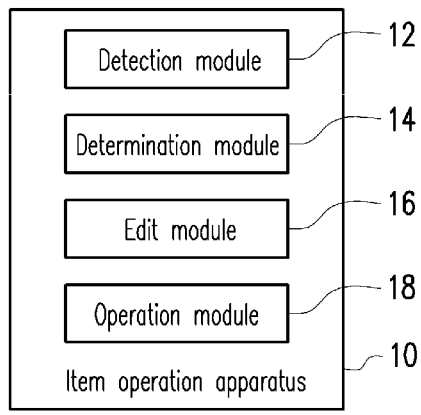
FIG. 1 is a block diagram illustrating an apparatus for operating items with multiple fingers according to an embodiment of the present invention.

FIG. 1 is a block diagram illustrating an apparatus for operating items with multiple fingers according to an embodiment of the present invention. With reference to FIG. 1, an item operation apparatus 10 includes a detection module 12, a determination module 14, an edit module 16 and an operation module 18. The modules may be, for example, hardware apparatuses composed of logic circuit elements and capable of performing functions of operating items with multiple fingers. Alternatively, the modules may also be programs stored in a storage medium of a portable apparatus and capable of being loaded in a processor of the portable apparatus to perform the functions of operating items with multiple fingers, but the present invention is not limited thereto. The item operation apparatus 10 may be installed or configured in a portable apparatus (such as a mobile phone, a tablet computer, a notebook computer (NB)) equipped with a touch screen, such that a user of the portable apparatus may operate a plurality of items displayed on the screen with multiple fingers.

Figure 2:
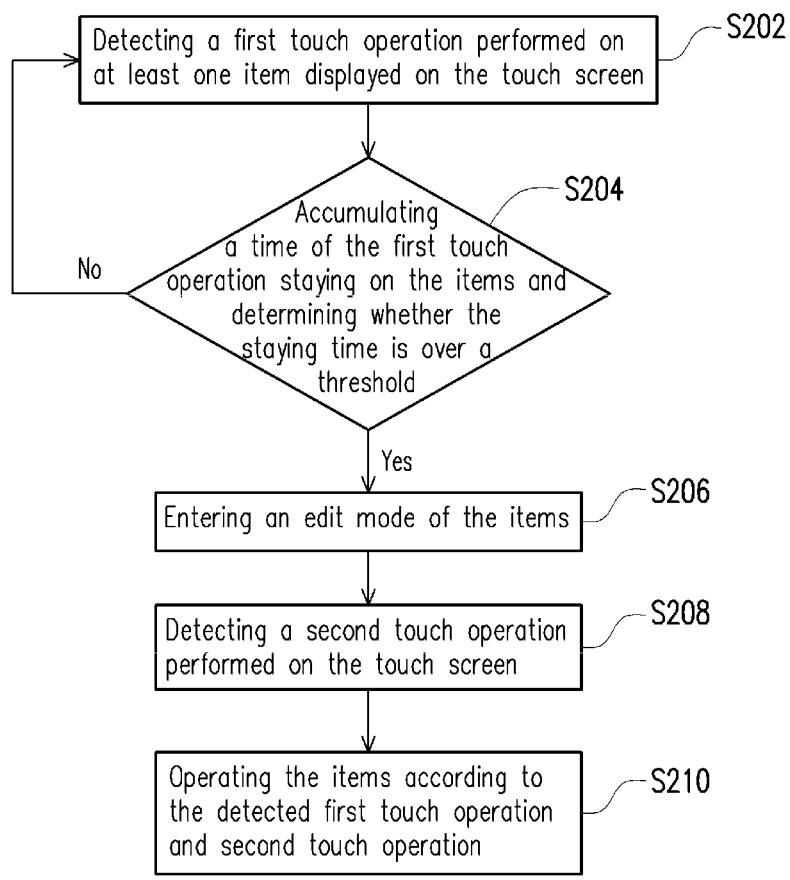
FIG. 2 is a flowchart illustrating a method for operating items with multiple fingers according to an embodiment of the present invention.

FIG. 2 is a flowchart illustrating a method for operating items with multiple fingers according to an embodiment of the present invention. Referring to FIG. 2 with FIG. 1, the method of the present embodiment is adapted to the item operation apparatus 10, and detailed steps of the method of the present embodiment will be described with reference to each element of the item operation apparatus 10 depicted in FIG. 1.

First, the detection module 12 detects a first touch operation performed by a user on at least one item displayed on a touch screen (step S202). The first touch operation detected by the detection module 12 includes, for example, a plurality of touch points continuously sensed by the touch screen at the same time or within a short time period. The touch points respectively fall on the items displayed on the touch screen so as to indicate that the user wishes to operate the items simultaneously.

Then, the determination module 14 accumulates a time of the first touch operation staying on the items and determines whether the staying time is over a predetermined threshold (step S204). In the present embodiment, whether the user is about to tap the items or perform an edit operation on the items is distinguished according to a length of the staying time of the touch operation, and erroneous operations resulted from inadvertent touches of the user may be avoided.

If the staying time is not over the threshold, the flow is returned to the step S202, in which the detection module 12 continues to detect touch operations. Otherwise, if the staying time is over the threshold, it represents that the user intends to perform an edit operation on the items, and the edit module 16 controls the portable apparatus to enter an edit mode of the item (step S206). Therein, the edit module 16, for example, displays all the items touched by the first touch operation on a current page of the touch screen in a manner of floating, jiggling or highlighting, so as to prompt the user that the edit mode of the items is entered.

After the edit mode is entered, the operation module 18 detects a second touch operation performed by the user on the touch screen using the detection module 12 (step S208) and operates the items according to the first touch operation and the second touch operation detected by the detection module 12 (step S210). In detail, the second touch operation is, for example, a touch operation performed on other items displayed on the touch screen or touch operations of gestures performed on the touch screen, such as a tapping, double tapping, swiping, zoom-in/zoom-out operations and so forth, and the present invention is not limited thereto.

It is to be noted that in an embodiment, after the edit mode is entered and before the second touch operation is detected, if the touch points of the first touch operation previously detected by the detection module 12 are released simultaneously, it is inferred that the user intends to group or collect the items touched by the touch points. Thus, the operation module 18, for example, creates a new folder on a current page and moves or adds all the items touched by the first touch operation to the newly created folder so as to complete the grouping or collecting operation of the items.

By the method described above, the user may achieve editing a plurality of items simply with multiple fingers so as to increase usage convenience of the apparatus. Further, an interoperation between the second touch operation and the first touch operation is provided by the present invention to increase a variety of the operations on the items.

In details, after the edit mode is entered, the items under the edit operation previously triggered by the first touch operation, for example, are departed from their original positions, and floated on the current page. At this time, when the second touch operation is performed on other items or pages on the touch screen, the items to be edited will not be influenced. However, when the user opens a page of other items or switches to another page by the second touch operation, the items being edited are also moved away from the original page, and the positions of the items being edited are adjusted on the touch screen with the movement of the first touch operation. When the user releases the first touch operation, the items being edited are added or moved to a new page so as to complete the edit operation. Embodiments will be described in detail below.

Figure 3:
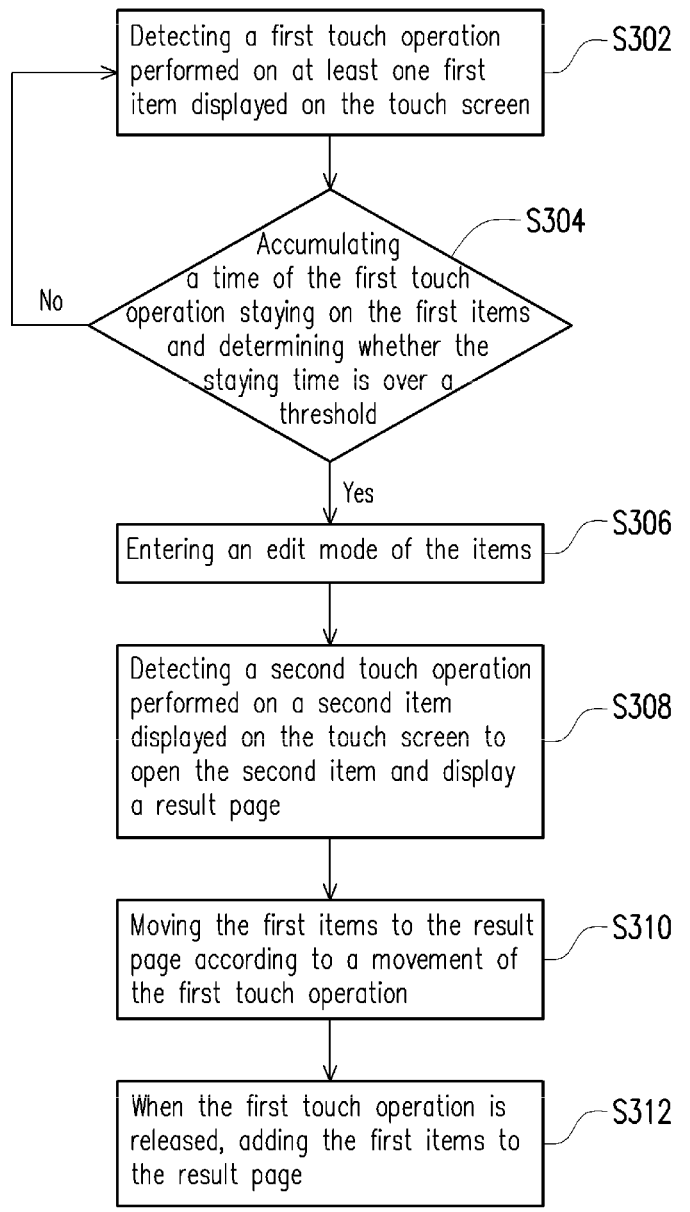
FIG. 3 is a flowchart illustrating a method for operating items with multiple fingers according to an embodiment of the present invention.

Regarding opening the items, FIG. 3 is a flowchart illustrating a method for operating items with multiple fingers according to an embodiment of the present invention. Referring to FIG. 3 with FIG. 1, the method of the present embodiment is adapted to the item operation apparatus 10, and detailed steps of the method of the present embodiment will be described with reference to each element of the item operation apparatus 10 depicted in FIG. 1.

First, the detection module 12 detects a first touch operation performed by the user on at least one first item displayed on the touch screen (step S302). Then, the determination module 14 accumulates a time of the first touch operation staying on the first items and determines whether the staying time is over a predetermined threshold (step S304). If the staying time is not over the threshold, the flow is returned to the step S302, and the detection module 12 continues to detect touch operations. Otherwise, if the staying time is over the threshold, it represents that the user intends to perform an edit operation on the first items. Thus, the edit module 16 controls the portable apparatus to enter an edit mode of the first items (step S306). Detailed implementation of the steps S302 through S306 is identical or similar to the steps S202 through S206 in the above embodiment, and will not be repeatedly described herein.

Differing from the above embodiment, in the present embodiment, after the edit mode is entered, the operation module 18 detects a second touch operation performed by the user on a second item displayed on the touch screen so as to open the second item to display a result page (step S308). The second item is, for example, a folder, a menu, an icon or a widget. If the second item is an icon of an application, the displayed result page is an operation page of the application. If the second item is a folder, the displayed result page is a content page of the folder. The aforementioned types of the result page are merely illustrated as examples, and the present invention is not limited thereto.

Moreover, in step S310, according to the movement of the first touch operation, the operation module 18 may also move the first items touched by the first touch operation to the result page, such as the operation page of the application or the content page of the folder, but the present invention is not limited thereto.

Finally, when the first touch operation is released, the operation module 18 adds the first items to the result page so as to complete the edit operation of the first items and exit the edit mode (step S312). When adding the first items to the result page, the operation module may, for example, further rearrange items in the result page according to a predetermined arrangement rule.

By alternatively performing the first touch operation and the second touch operation, the user may simply moves or adds a plurality of items to other items.

Figure 4A:
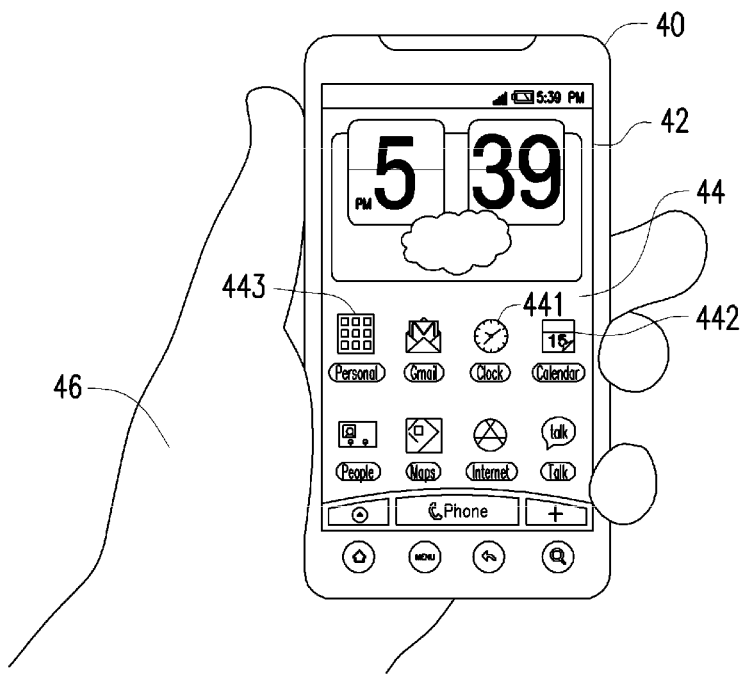
FIG. 4A through FIG. 4E illustrate an example of a method for operating items with multiple fingers according to an embodiment of the present invention.
Figure 4B:
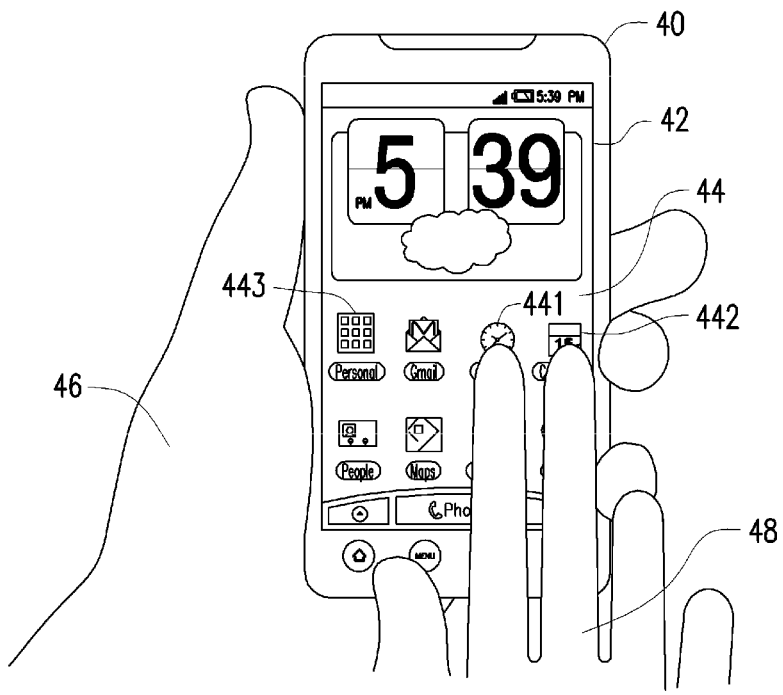
Figure 4C:
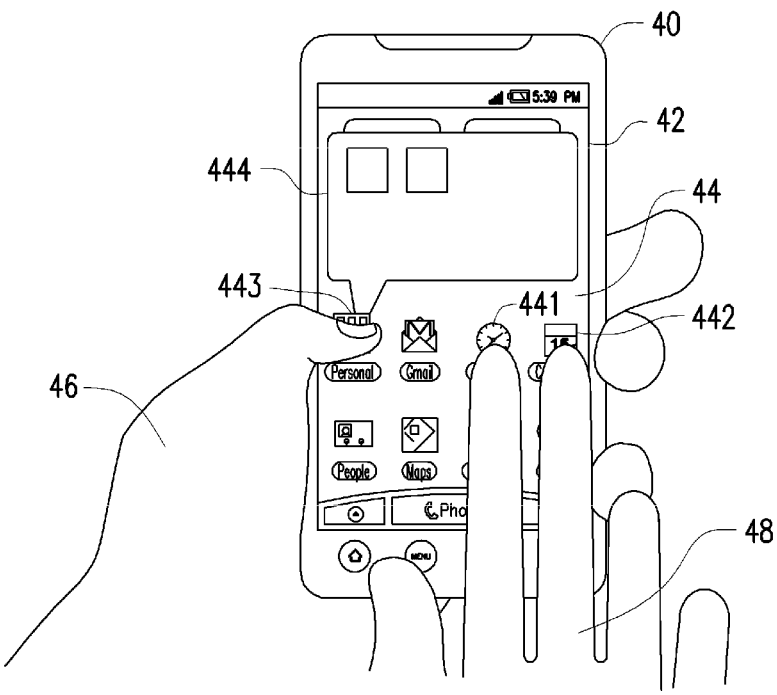
Figure 4D:
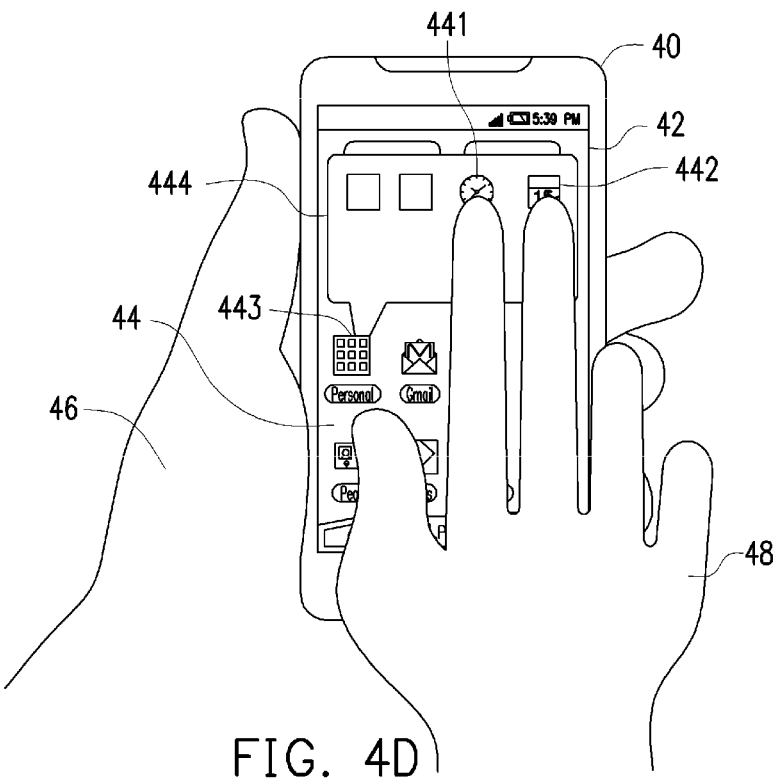
Figure 4E:
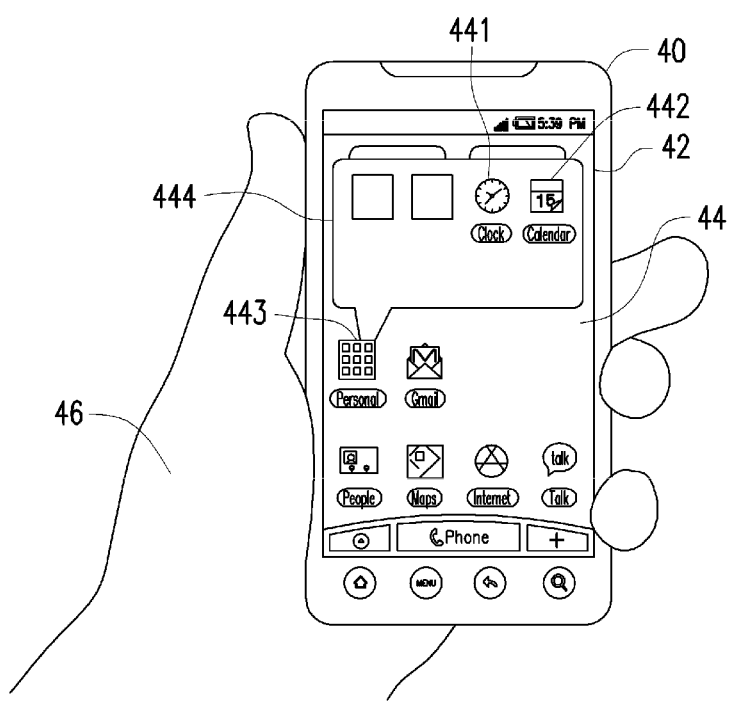

For instance, FIG. 4A through FIG. 4E illustrate an example of a method for operating items with multiple fingers according to an embodiment of the present invention. Referring to FIG. 4A first, a portable apparatus 40 of the present embodiment is, for example, a smart phone including a touch screen 42, and a page 44 displayed on the touch screen 42 includes icons of a plurality of applications (such as a clock icon 441, a calendar icon 442 and a folder icon 443). When the user holds the portable apparatus 40 with the left hand 46 and simultaneously touches the clock icon 441 and the calendar icon 442 with two fingers of the right hand 48 (as shown in FIG. 4B), the clock icon 441 and the calendar icon 442 are floating on the page 44 so as to prompt the user that the portable apparatus 40 has entered an edit mode of the clock icon 441 and the calendar icon 442. Then, the user may further touch the folder icon 443 with a finger of the left hand 46 to open a content page 444 of the folder icon 443 (as shown in FIG. 4C). Then, the user may swipe upward with the fingers of the right hand 48 to move the clock icon 441 and the calendar icon 442 into the content page 444 (as shown in FIG. 4D). Finally, the user may release the touches from the clock icon 441 and the calendar icon 442 so as to add the clock icon 441 and the calendar icon 442 into the content page 444 (as shown in FIG. 4E), and the edit operation on the clock icon 441 and the calendar icon 442 is completed.

Figure 5:
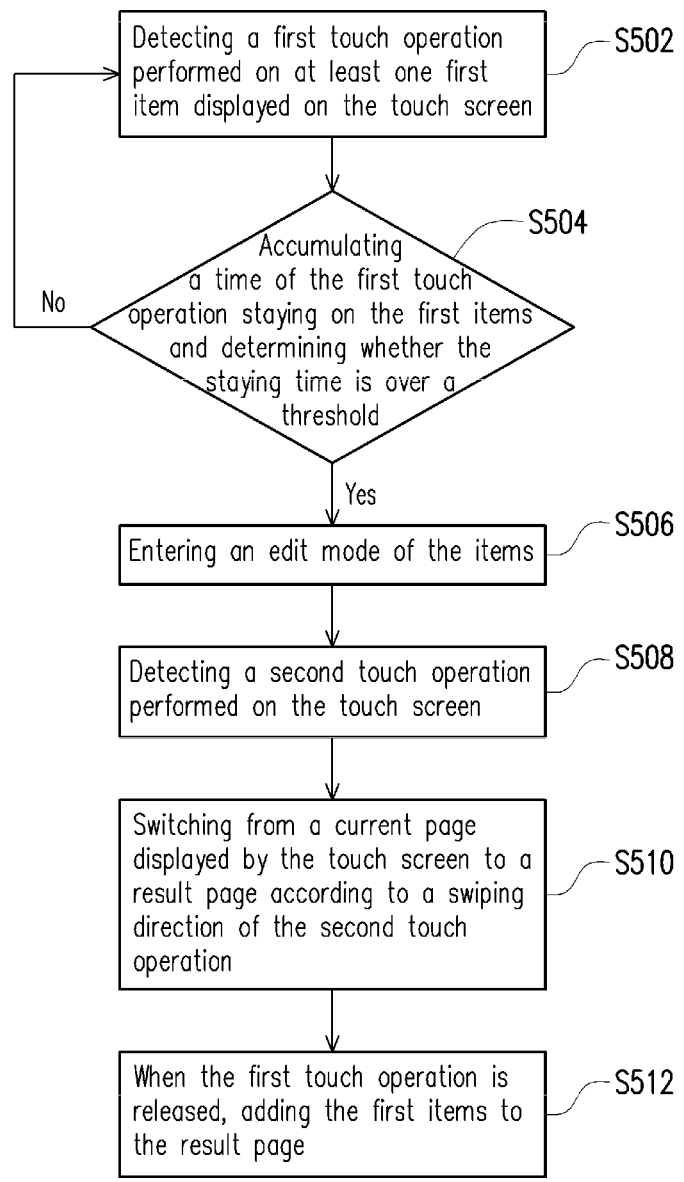
FIG. 5 is a flowchart illustrating a method for operating items with multiple fingers according to an embodiment of the present invention.

Regarding switching between the pages, FIG. 5 is a flowchart illustrating a method for operating items with multiple fingers according to an embodiment of the present invention. Referring to FIG. 5 with FIG. 1, the method of the present embodiment is adapted to the item operation apparatus 10, and detailed steps of the method of the present embodiment will be described with reference to each element of the item operation apparatus 10 depicted in FIG. 1.

First, the detection module 12 detects a first touch operation performed by the user on first items displayed on the touch screen (step S502). Then, the determination module 14 accumulates a time of the first touch operation staying on the first items and determines whether the staying time is over a predetermined threshold (step S504). If the staying time is not over the threshold, the flow is returned to the step S502, and the detection module 12 continues to detect touch operations. Otherwise, if the staying time is over the threshold, it represents that the user intends to perform an edit operation on the first items. Thus, the edit module 16 controls the portable apparatus to enter an edit mode of the first items (step S506). Detailed implementation of the steps S502 through S506 is identical or similar to the steps step S202 through S206 in the above embodiment, and will not be repeatedly described herein.

Differing from the above embodiment, in the present embodiment, after the edit mode is entered, the operation module 18 detects a second touch operation swiped by the user on the touch screen (step S508) and switches from a current page displayed on the touch screen to a result page according to a swiping direction of the second touch operation (step S510). If the second touch operation is swiped rightward, the displayed result page is, for example, a previous page of the current page. If the swiping direction of second touch operation is leftward, the displayed result page is, for example, a next page of the current page. If the current page is the leftist page of all pages and the swiping direction of second touch operation is rightward, the result page being switched to is, for example, the right most page of all pages. If the current page is the right most page of all pages and the swiping direction of second touch operation is leftward, the result page being switched to is, for example, the leftist page of all pages. The aforementioned page switching manner is merely illustrated as an example, and the present invention is not limited thereto.

Finally, when the first touch operation is released, the operation module 18 adds the first items to the result page so as to complete the edit operation of the first item and exit the edit mode (step S512). Moreover, when adding the at least one first item to the result page, the operation module 18 may further rearrange items in the result page according to a predetermined arrangement rule or place the first items in a position corresponding to its original position in the result page, but the present invention is not limited thereto.

By alternatively performing the first touch operation and the second touch operation, the user may simply move or add a plurality of items into other pages.

Figure 6A:
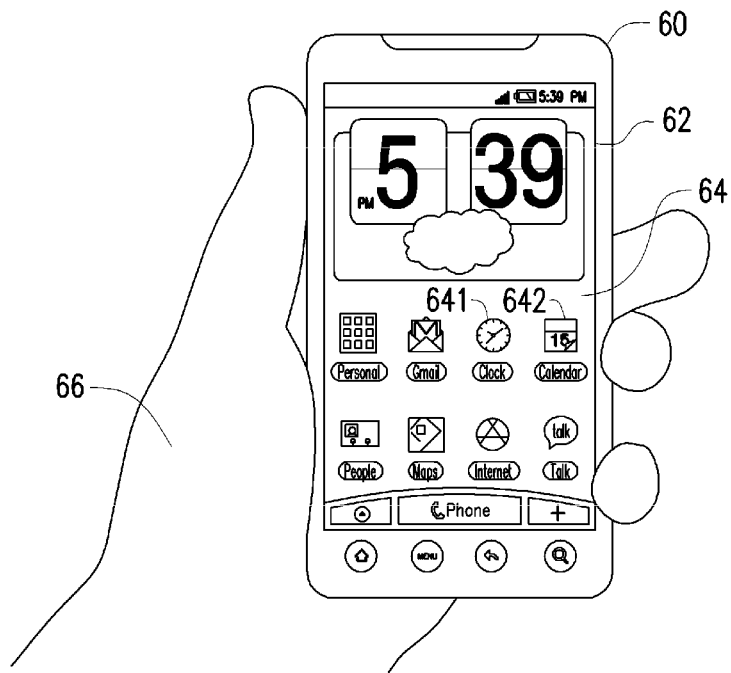
FIG. 6A through FIG. 6E illustrate an example of a method for operating items with multiple fingers according to an embodiment of the present invention.
Figure 6B:
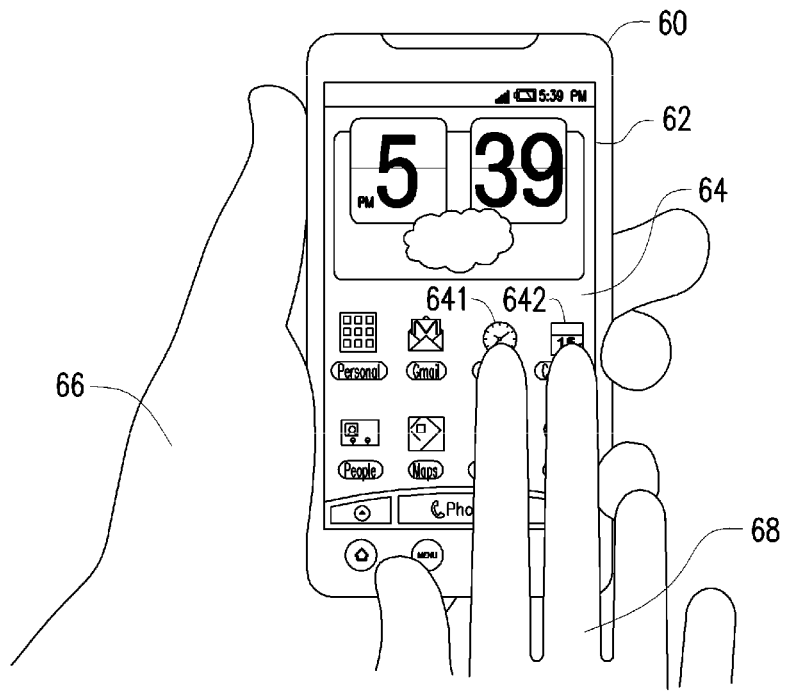
Figure 6C:
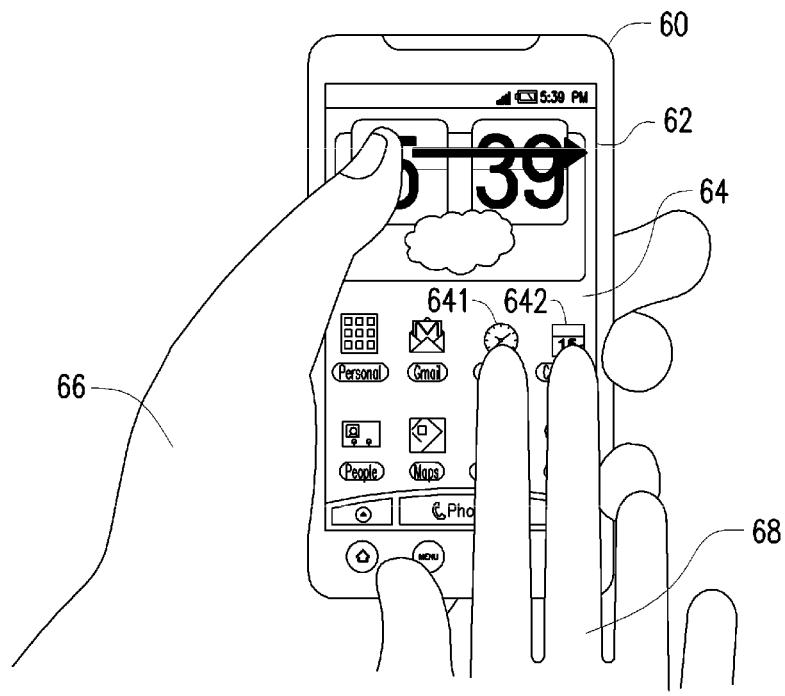
Figure 6D:
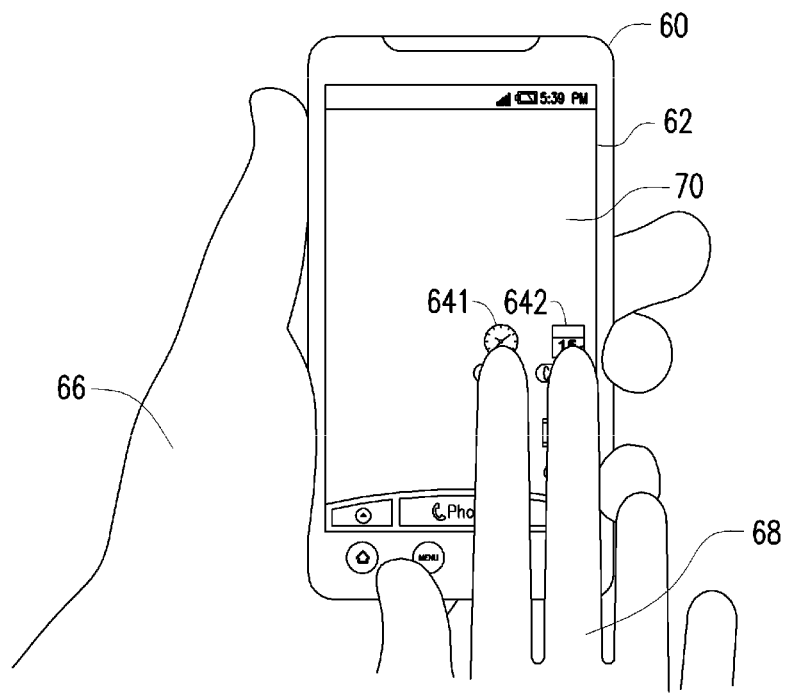
Figure 6E:
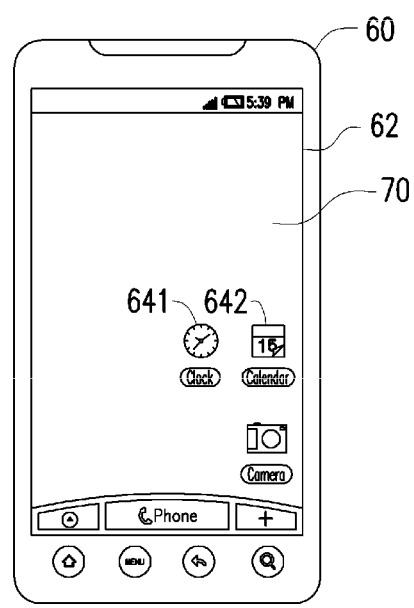

For instance, FIG. 6A through FIG. 6E illustrate an example of a method for operating items with multiple fingers according to an embodiment of the present invention. Referring to FIG. 6A first, a portable apparatus 60 of the present embodiment is, for example, a smart phone including a touch screen 62, and a page 64 displayed on the touch screen 62 includes icons of a plurality of applications (such as a clock icon 641 and a calendar icon 642). When the user holds the portable apparatus 60 with the left hand 66 and touches the clock icon 641 and the calendar icon 642 with two fingers of the right hand 68 simultaneously (as shown in FIG. 6B), the clock icon 641 and the calendar icon 642 are floating on the page 64 so as to prompt the user that the portable apparatus 60 has entered an edit mode of the clock icon 641 and a calendar icon 642. Then, the user may further touch on the touch screen 62 and swipe from the left to the right with fingers of the left hand 66 (as shown in FIG. 6C) to switch from the page displayed on the touch screen 62 to a previous page 70 of the current page 64 (as shown in FIG. 6D). Finally, the user may release the touches from the clock icon 641 and the calendar icon 642 so as to add the clock icon 641 and the calendar icon 642 to the page 70 (as shown in FIG. 6E), and finally the edit operation of clock icon 641 and the calendar icon 642 is completed.

The present invention further provides a computer program product, for executing each step of the method for operating items with multiple fingers. The computer program consists of a plurality of code segments (for example, an organization chart establishing program code segment, a form signing program code segment, a setting program code segment, and a deployment program code segment) and after the program code segments are loaded in the portable apparatus and executed, the steps of the method for operating items with multiple fingers are carried out.

Based on the above, in the method, the apparatus and the computer program product for operating items with multiple fingers according to the present invention, the edit mode of the items is triggered by multiple fingers of one hand touching the items, and another operation is performed with fingers of the other hand, so as to open a page for placing the items, switch to another page for moving the items or create a new folder therein for placing the items. Accordingly, a plurality of items displayed on the screen may be operated simultaneously to increase operational variety.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for operating items with multiple fingers, adapted to a portable apparatus having a touch screen, the method comprising:
  detecting a first touch operation performed on at least one first item displayed on a first position on a current page on the touch screen;
  accumulating a staying time of the first touch operation on the at least one first item;
  determining whether the staying time is over a threshold;
  entering an edit mode of the at least one first item in response to a determination that the staying time is over the threshold, wherein the at least one first item is in a floating state during the edit mode;
  detecting a second touch operation swiping on the current page on the touch screen and determining a swiping direction of the second touch operation while the first touch operation is staying on the at least one first item;
  switching from the current page displayed on the touch screen to a first result page in response to detecting the second touch operation swiping on the current page on the touch screen while the first touch operation is staying on the at least one first item, wherein the first result page is a previous page of the current page in response to a determination that the swiping direction of the second touch operation is substantially rightward, and the first result page is a next page of the current page in response to a determination that the swiping direction of second touch operation is substantially leftward, and wherein the current page is not displayed on the touch screen after switched to the first result page;

determining whether the first touch operation is a drag touch operation for moving the at least one first item on the first result page;

moving the at least one first item to a second position on the first result page according to the drag touch operation, wherein the positions of the first position and the second position related to the touch screen are different; and adding the at least one first item to the second position on the first result page in response to detecting the first touch operation is released.

2. The method according to claim 1, wherein the first touch operation comprises a plurality of touch points and the touch points are respectively located on each of the at least one first item.

3. The method according to claim 1, wherein the at least one first item comprises a folder, a menu, an icon or a widget.

4. The method according to claim 1, comprising:
creating a new folder for placing the at least one first item.

5. The method according to claim 1, further comprising: detecting a third touch operation performed on a second item displayed on the touch screen to open the second item and display a second result page; detecting a fourth touch operation performed on at least one third item displayed on the touch screen; moving the at least one third item to the second result page according to a movement of the fourth touch operation; and adding the at least one third item to the second result page in response to detecting the fourth touch operation is released.

6. The method according to claim 5, wherein the at least one third item or the second item comprises a folder, a menu, an icon or a widget.

7. The method according to claim 1, further comprising:
rearranging items in the first result page according to an arrangement rule.

8. The method according to claim 5, further comprises:
rearranging items in the second result page according to an arrangement rule.

9. An apparatus for operating items with multiple fingers, comprising:
a detection module, detecting a first touch operation performed on at least one first item displayed on a first position on a current page on the touch screen;
a determination module, accumulating a staying time of the first touch operation on the at least one first item and determining whether the staying time is over a threshold;
an edit module, entering an edit mode of the at least one first item in response to the determination module determining that the staying time is over the threshold, wherein the edit module floats the at least one first item on the current page displayed on the touch screen during the edit mode; and
an operation module, detecting a second touch operation swiping on the touch screen by using the detection module, switching from a current page displayed by the touch screen to a first result page according a swiping direction of the second touch operation and adding the at least one first item to the first result page in response to detecting the first touch operation is released, wherein the first result page is a previous page of the current page in response to a detection that the swiping direction of the second touch operation is substantially rightward, and the first result page is a next page of the current page in response to a detection that the swiping direction of second touch operation touch operation is substantially leftward, and wherein the current page is not displayed on the touch screen after switched to the first result page.

10. The apparatus according to claim 9, wherein the first touch operation comprises a plurality of touch points and the touch points are respectively located on each of the at least one first item.

11. The method according to claim 9, wherein the at least one first item comprises a folder, a menu, an icon or a widget.

12. The apparatus according to claim 9, wherein the operation module creates a new folder for placing the at least one first item.

13. The apparatus according to claim 9, wherein the operation module further detects a third touch operation performed on a second item displayed on the touch screen to open the second item and display a second result page, moves at least one third item to the second result page according to a movement of a fourth touch operation and adds the at least one third item to the second result page when the fourth touch operation is released.

14. The apparatus according to claim 13, wherein the second item or the at least one third item is a folder, a menu, an icon or a widget.

15. The apparatus according to claim 9, wherein the operation module further rearranges items in the first result page according to an arrangement rule.

16. The apparatus according to claim 13, wherein the operation module further rearranges items in the second result page according to an arrangement rule.

17. The apparatus according to claim 9, wherein the operation module further moves the at least one first item to a second position on the first result page in response to a detection that the first touch operation is a drag touch, wherein the positions of the first position and the second position related to the touch screen are different.

18. A computer program product, for being loaded to a portable apparatus to execute following steps:
detecting a first touch operation performed on at least one first item displayed on a first position on a current page on the touch screen;
accumulating a staying time of the first touch operation on the at least one first item;
determining whether the staying time is over a threshold;
entering an edit mode of the at least one first item in response to a determination that the staying time is over the threshold, wherein the at least one first item is in a floating state during the edit mode;
detecting a second touch operation swiping on the current page on the touch screen and determining a swiping direction of the second touch operation while the first touch operation is staying on the at least one first item;
switching from the current page displayed on the touch screen to a first result page in response to detecting the second touch operation swiping on the current page on the touch screen while the first touch operation is staying on the at least one first item, wherein the first result page is a previous page of the current page in response to a determination that the swiping direction of the second touch operation is substantially rightward, and the first result page is a next page of the current page in response to a determination that the swiping direction of second touch operation is substantially leftward, and wherein the current page is not displayed on the touch screen after switched to the first result page;

determining whether the first touch operation is a drag touch operation for moving the at least one first item on the first result page;

moving the at least one first item to a second position on the first result page according to the drag touch operation, wherein the positions of the first position and the second position related to the touch screen are different; and adding the at least one first item to the second position on the first result page in response to detecting the first touch operation is released.

* * * * *